Nov. 23, 1926. 1,607,734
A. FORTINI
HOISTING MECHANISM
Filed May 15, 1923   3 Sheets-Sheet 1
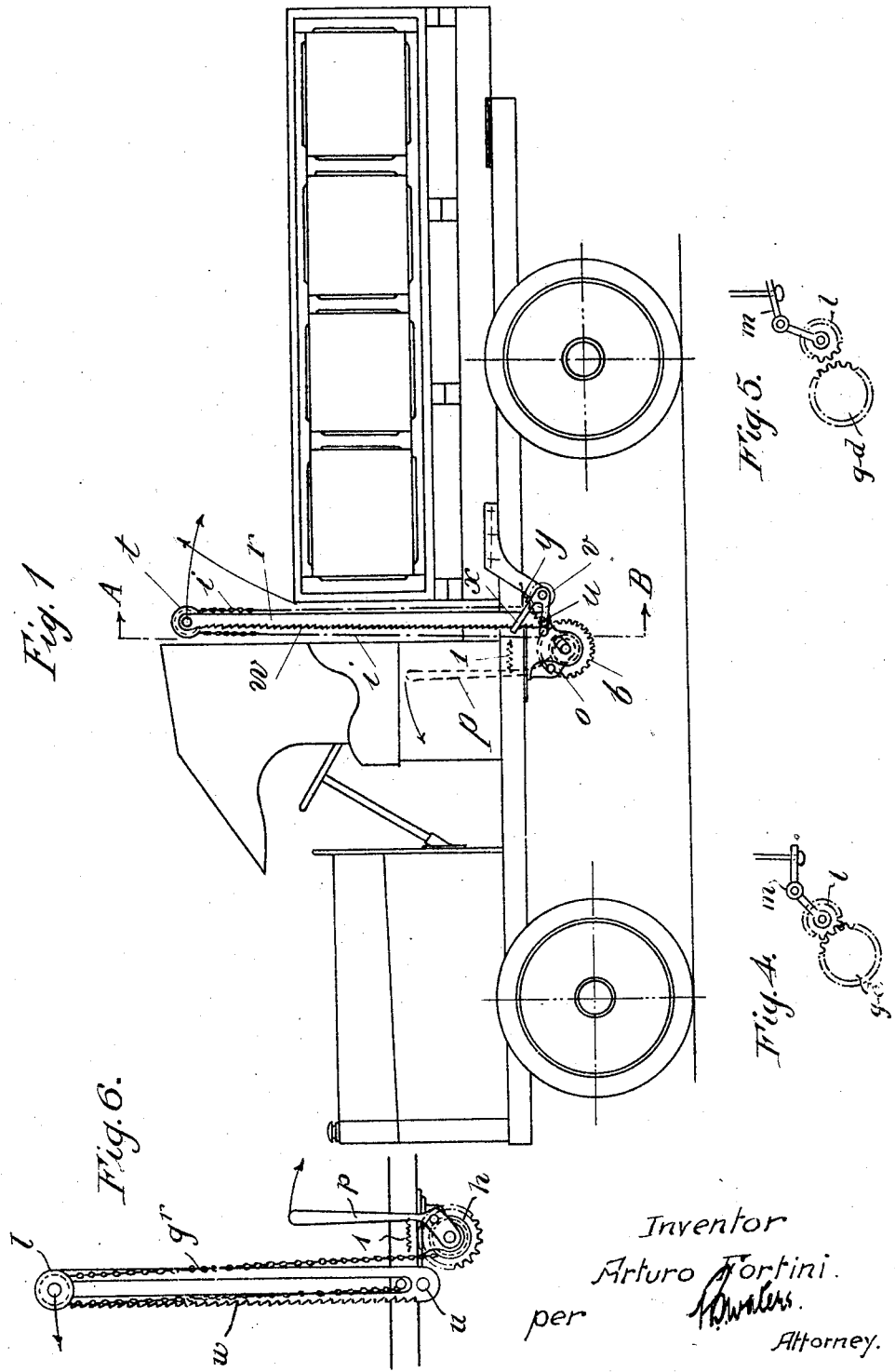
Inventor
Arturo Fortini.
per
Attorney.

Nov. 23, 1926.  1,607,734
A. FORTINI
HOISTING MECHANISM
Filed May 15, 1923   3 Sheets-Sheet 2
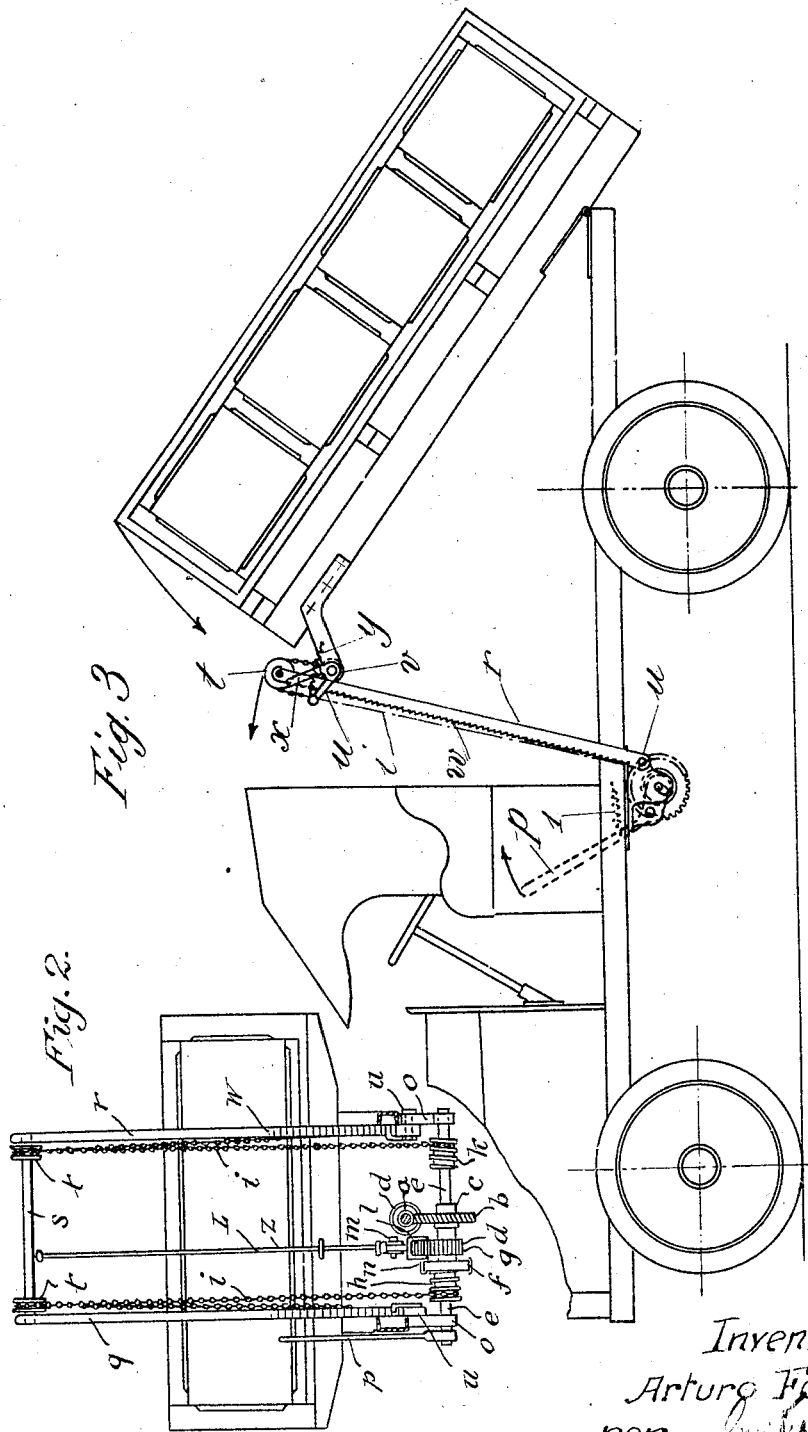
Inventor
Arturo Fortini
per [signature]
Attorney

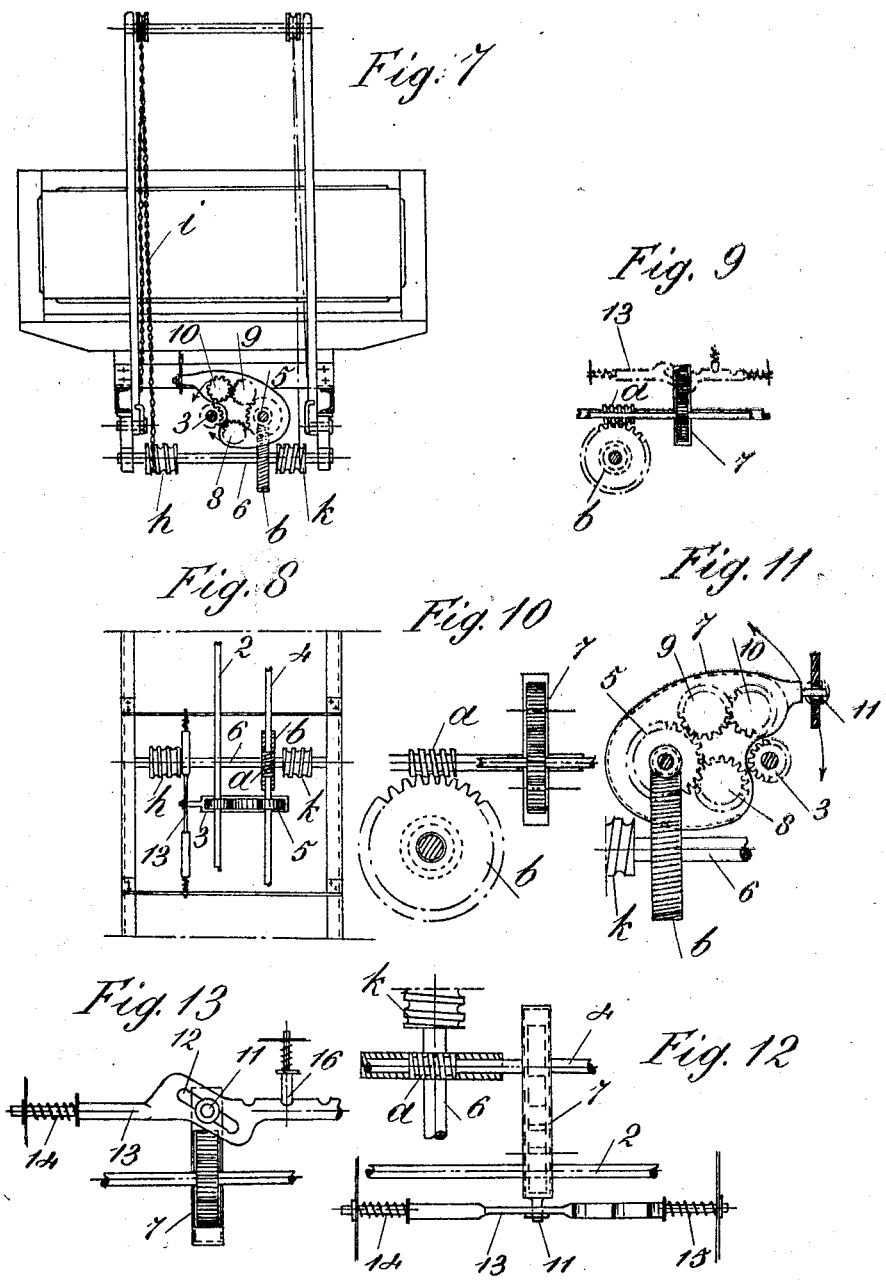

Patented Nov. 23, 1926.

1,607,734

UNITED STATES PATENT OFFICE.

ARTURO FORTINI, OF FLORENCE, ITALY.

HOISTING MECHANISM.

Application filed May 15, 1923, Serial No. 639.095, and in Italy May 17, 1922.

The device has for its object the raising of the body of a motor truck which is rearwardly hinged or jointed, so that the plane of the body may assume a slope or inclination to cause loose goods contained therein to slide rearwardly and to be discharged.

The device, which utilizes the power provided by the engine of the motor truck itself, comprises geared transmission mechanism with a worm and worm wheel, or other suitable gearing system, winding rollers, chains and supporting pillars, positioned in such manner that their operation serves the purpose in view.

The shifting of the hoisting mechanism into or out of gear is effected, at will, by the driver himself, without leaving his seat.

The main feature of this invention is that the apparatus is provided with stanchions or movable pillars pivoted at their base, in such manner that they incline on the inclination of the body without the occurrence of any stress or fracture in connection with the hoisting chains, or even with the pillars themselves.

The accompanying drawing shows a practical example of the invention; therein Fig. 1 is a side view of the motor truck, as a whole, in its normal position; Fig. 2 a cross section on line —A—B— in Fig. 1; Fig. 3 shows the truck with the body in the raised position.

Figs. 4 and 5 represent, respectively, the position of the apparatus when raised and out of gear.

Fig. 6 shows a stanchion, or double pillar, for trucks of greater carrying capacity.

Fig. 7 is a rear view; Fig. 8 is a plan view of the operating gear; Fig. 9 is a detail view showing part of the gear in side elevation; Fig. 10 is an enlarged side view of part of Fig. 9; Figs. 11 and 12 are detail views drawn to a larger scale showing in side, front and plan view, respectively, a variation for the engaging and disengaging of the hoisting gears. Fig. 13 shows the movement-control in this system.

Referring to Figs. 1, 2, 3, 4, 5 and 6 of the drawings the worm —a— is fastened to the connecting or transmission shaft coming from the friction gear and revolves therewith; a worm wheel —b— is fixed upon a boss —c—, centrally perforated, and having its extremity —d— shaped after the fashion of a spur-gear; the boss —c— turns loosely on the shaft —e—. To the same shaft is rigidly fixed another boss —f— which likewise carries gearing —g— of the same size and shape as the gear —d—, and in close proximity therewith. To this boss —f— is likewise fastened a roller or drum —h— for the winding of the chain —i—; on the shaft —e— is also fixed another winding drum —k—.

In the vicinity of the two gears —d—, —g— there is another gear —l—, which is enabled, by means of a hinged lever support —m— to take into the gears —d—, —g—, to which it is similar in shape. To the boss —f— is also keyed or bolted a disc —n— which acts as a brake disc in order to prevent too rapid a descent when the box is being lowered.

The system consisting in the worm wheel and in the drums fixed to the shaft —e— is enabled to swing with the supports —o—, —o—, one of which ends in the lever —p—.

All the above statements relate to an example of the transmission of motion through the engine.

For the purpose of raising the body or box there are two pillars —q—, —r—, single or double, movable at the foot and carrying at their upper ends a connecting shaft —s— upon which are rotatable two groove-wheels or pulleys —t—, —t—, sustaining the chains —i—, —i— which are hooked at one end to the winding rollers or drums —h—, —k— and at the other, to the movable body of the truck.

The operation of the apparatus according to this example is as follows:—

When the engine is running and causes the worm —a— to turn, the driver acts on the lever —p— in such manner as to cause the rotation of the system carried by the shaft —e— and thus make the worm wheel —b— mesh with the worm —a—; hereupon the rotation of the worm wheel and of the boss —c— with the gearing —d— is brought about.

If the gear —l— which is carried by the hinged support —m— is so arranged as to engage with the gears —d—, —g—, the motion of the boss —c— will also cause the rotation of the boss —f— and therewith that of the drums —h—, —k— around which the chains —i— will begin to wind, thus becoming taut, and they will no longer allow the worm wheel —b— to become disengaged from the worm —a—, even should the lever —p— be left to itself.

The shaft —s— connects the upper ends of the two pillars —q—, —r— which form the framing of the system; these pillars are movable, being pivoted by means of the pivot —u—, so that when the body is raised and the point —v— describes an arc the pillars —q—, —r— will be inclined, following the course the point —v—, without any stress or fracture occurring.

In order to lessen the friction which it would cause by rising until it came into contact with the pillars, the point —v— is furnished with deeply grooved pulleys, which besides lessening the friction, also serve to guide the body during its ascending movement.

Externally, the pillars carry a saw-toothed bar —w— with which engages a special automatic pawl —x—; said pawl being maintained in working position by an appropriate spring —y— which keeps it constantly in engagement with the teeth —w— of the toothed bar.

When the raising of the body occurs, the latter proceeds until it attains the height previously determined, and, as soon as it reaches this point, it strikes against the end of a draw-rod —z— in such manner as to produce a tractive movement on the lever support —m—, causing it to rotate, and thus throw the gear —l— out of mesh with the other gears —g—, —d—, although they are under strain (see Fig. 5).

The disengagement of the gear —l— causes the stoppage of the ascending movement of the body which is held fast by the automatic pawls —x— in the position reached; the pawls also act as automatic safety stops during the raising of the box.

As the body is then supported solely by the pawls, and as the chains —i— are no longer under tension the system carried by the shaft —e— is free to drop by its own weight, being also under stress of the traction due to the springs —1— of the lever —p—, and —y— of the pawl —x—, thus bringing about the disengagement of the worm wheel from the worm.

On descending, the box strikes against the end of the support —m— and thus places the gear —l— in a position to operate anew (see Fig. 4).

The chains may be replaced by steel cables. The usual door at the rear of the body may be so arranged that its automatic opening is ensured when the box attains the required height; or else it may be hinged or jointed for the purpose of its being opened to any adjustable extent, so that, when the body is raised, on the vehicle being set in motion, the discharging of the goods and their consequent distribution along the route would be effected.

The other example of the motion transmission according to Figs. 7, 8, 9, 10, 11, 12 and 13 is greatly simplified, as compared with the first. In this second example the driving shaft —2— is fixed to the gear —3—. Parallel to said driving shaft —2—, and at a convenient distance; there is the shaft —4—, to which is fixed the gear —5— and the worm —a— engages the worm wheel —b—. The latter is carried by a transverse shaft —6—, upon which are fixed the winding rollers —h—, —k— for the winding of the chains or steel cables —i—, which cables may be cylindrical or flat. In the latter case, the flat cables instead of being wound round the drums, spirally, will be wound round in superposed layers.

The gear —5— is carried by a box —7— in which are also the gears —8—9—10—, arranged as shown in Fig. 11. The box is pivoted to the shaft —4—, or at any other point or in any other manner.

At its upper part, the box carries a pin —11— which engages the slanting groove —12— of a draw-rod —13— (see Fig. 13) located longitudinally in respect of the frame.

Said draw-rod is suitably provided, at both ends, or elsewhere, with springs —14—, —15—, which, while allowing of the longitudinal displacement of the draw-rod itself, convey it back to the neutral position. The bar —13— is thus maintained in a position of rest by the two springs —14—, —15—, suitably positioned; a pawl —16— fastens the bar in the various positions of rest or work. By causing the bar to slide the driving gear —3— will be thrown into gear with the gears intended for the communication of movement to the worm.

As the sliding of the bar brings about the compression of a spring, which, by its own force, tends to push the bar back into a neutral position, as soon as the pawl has, by any suitable means, been removed, the bar urged by the spring, will automatically return to its position of rest; disengaging the driving gear from the other gears; thus, the ascending or descending movement of the body or box will be interrupted.

This arrangement guarantees the disengagement of the gears even when in gear and in action, without recourse being had to the operation of the friction gear; which disengagement may thus be readily effected, without any control on the part of the driver or any detriment to the teeth of the gears.

When it is desired to proceed to the raising of the body or box, the gears —9—, —10— are thrown into gear with the driving gear —3—, and in such manner the motion of gear —3— will be transmitted to the worm wheel —b— and to the rollers —h—, —k—, which, by causing the winding of the cables or chains, will bring about the raising of the body. The lowering will be effected by throwing gear —8— into gear with gear —3—. Of course the gears or the control of the box may be reversed.

The throwing of the gears into engagement with each other may also be controlled in some other suitable manner. The disengaging by means of the pawl —16— may be controlled by hand as well as automatically, so that it is possible to bring the box to a standstill whatever its working position may be.

Claims:

1. Hoisting mechanism for the movable bodies of motor trucks adapted for the rapid unloading of loose goods, comprising a frame, a pair of pillars pivoted on the frame and arranged to follow the body during its rotation, flexible hoisting means connected to the body and carried by the pillars, a system of gears controlled by the driver, at will, winding rollers mounted on the frame and around which the said flexible hoisting means are wound, toothed racks formed along the pillars themselves, and automatic pawls mounted directly on the movable body and engaging the teeth of said racks to support the body in its raised position independently of said flexible hoisting means.

2. Hoisting mechanism for the movable bodies of motor trucks adapted for the rapid unloading of loose goods, comprising a frame, a pair of pillars pivoted at their lower ends to said frame, and adapted to follow the body during its rotation, a cross shaft connected to the upper ends of the pillars, grooved pulleys on the cross shaft, flexible hoisting means connected to the body and passing over the said pulleys, a system of gears controlled by the driver at will, winding rollers mounted on the frame and around which the flexible hoisting means are wound, toothed racks formed along the pillars themselves and automatic pawls mounted directly on the movable body and engaging with teeth of said racks to support the body in its raised position independently of said flexible hoisting means.

3. Hoisting mechanism for the movable bodies of motor trucks adapted for the rapid unloading of loose goods, comprising a frame, a pair of pillars pivoted on the frame and arranged to follow the body during its rotation, pulleys mounted on the body and engaging the edges of the pillars, flexible hoisting means connected to the body, guide means on the pillars for engaging said hoisting means, a system of gears controlled by the driver at will, winding rollers mounted on the frame and around which the said flexible hoisting means are wound, toothed racks formed along the pillars themselves and automatic pawls mounted directly on the movable body and engaging the teeth of said racks to support the body in its raised position independently of said flexible hoisting means.

4. Hoisting mechanism for the movable bodies of motor trucks adapted for the rapid unloading of loose goods, comprising a frame, a pair of toothed pillars pivoted at their lower ends to said frame and arranged to follow the body during its rotation, pulleys mounted on the body and engaging the edges of the said pillars, a cross shaft connected to the upper ends of said pillars, flexible hoisting means connected to the body and carried by said cross shaft, a system of gears controlled by the driver, at will, winding rollers mounted on the frame and around which the said flexible hoisting means are wound, and automatic pawls mounted directly on the movable body and engaging with teeth of said pillars to support the body in its raised position independently of said flexible hoisting means.

5. Hoisting mechanism for the movable bodies of motor trucks adapted for the rapid unloading of loose goods, comprising a frame, a pair of toothed pillars pivoted on the frame and arranged to follow the body during its rotation, flexible hoisting means connected to the body and carried by the pillars, a system of gears controlled by the driver, at will, winding rollers mounted on the frame and around which the said flexible hoisting means are wound, automatic pawls mounted on the movable body and engaging the edges of the pillars, pawls also mounted on the body and engaging the teeth of the pillars to support the body in its raised position, and a draw rod co-operating with the said gears and the movable body to stop the hoisting operation when the body is in its raised position and supported by the said pawls.

In testimony whereof I have signed my name to this specification.

ARTURO FORTINI. [L. S.]